United States Patent

Franz et al.

Patent Number: 5,696,584
Date of Patent: Dec. 9, 1997

[54] PHASE GRATING HAVING AN UNPROTECTED RELIEF STRUCTURE WITH A GRATING STRUCTURE THAT CAUSES DESTRUCTIVE INTERFERENCE OF REFLECTIONS

[75] Inventors: Andreas Franz, Trostberg; Walter Huber, Traunstein, both of Germany

[73] Assignee: Johannes Heidenhain GmbH, Traunreut, Germany

[21] Appl. No.: 592,641

[22] Filed: Jan. 26, 1996

[30] Foreign Application Priority Data

Jan. 28, 1995 [DE] Germany ............... 195 02 727.2

[51] Int. Cl.⁶ ............... G01B 9/02
[52] U.S. Cl. ............... 356/356; 250/237 G; 359/569
[58] Field of Search ............... 356/356, 354; 250/237 G; 359/566, 569; 430/5; 156/633, 653

[56] References Cited

U.S. PATENT DOCUMENTS

| | | |
|---|---|---|
| 4,776,701 | 10/1988 | Pettigrew . |
| 4,780,175 | 10/1988 | Taneya et al. . |
| 4,828,356 | 5/1989 | Hobrock et al. . |
| 5,046,827 | 9/1991 | Frost et al. . |
| 5,240,550 | 8/1993 | Boehnke et al. . |

FOREIGN PATENT DOCUMENTS

| | | |
|---|---|---|
| 0409188 | 1/1991 | European Pat. Off. . |
| 0424110 | 4/1991 | European Pat. Off. . |
| 0478055 | 1/1992 | European Pat. Off. . |
| 34 12 958 | 10/1985 | Germany . |
| 2220765 | 8/1988 | United Kingdom . |

OTHER PUBLICATIONS

Dissertation by Jörg Willhelm, "Photoelektrische Aufnehmer zur Messung von Lageärungen," p. 19, 1978.

Primary Examiner—Samuel A. Turner
Attorney, Agent, or Firm—Brinks Hofer Gilson & Lione

[57] ABSTRACT

An uncovered unprotected phase grating includes a substrate which has a relief structure. The relief structure includes a high-refraction material so that even if soiled with impeding ambient media an adequate difference in the index of refraction exists and the diffraction effect is preserved.

5 Claims, 2 Drawing Sheets

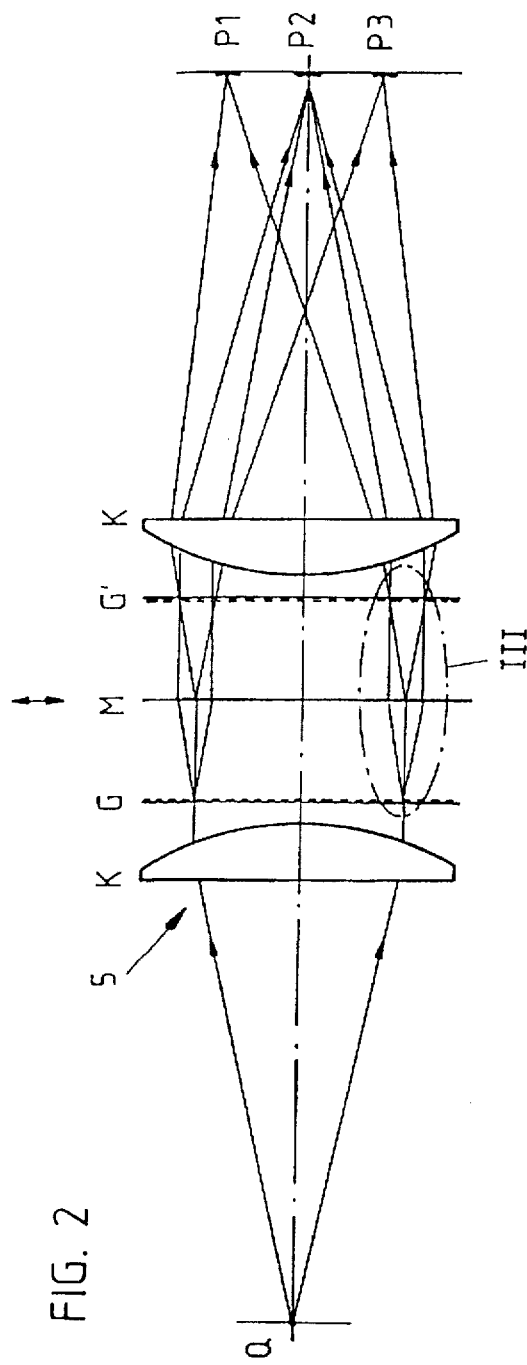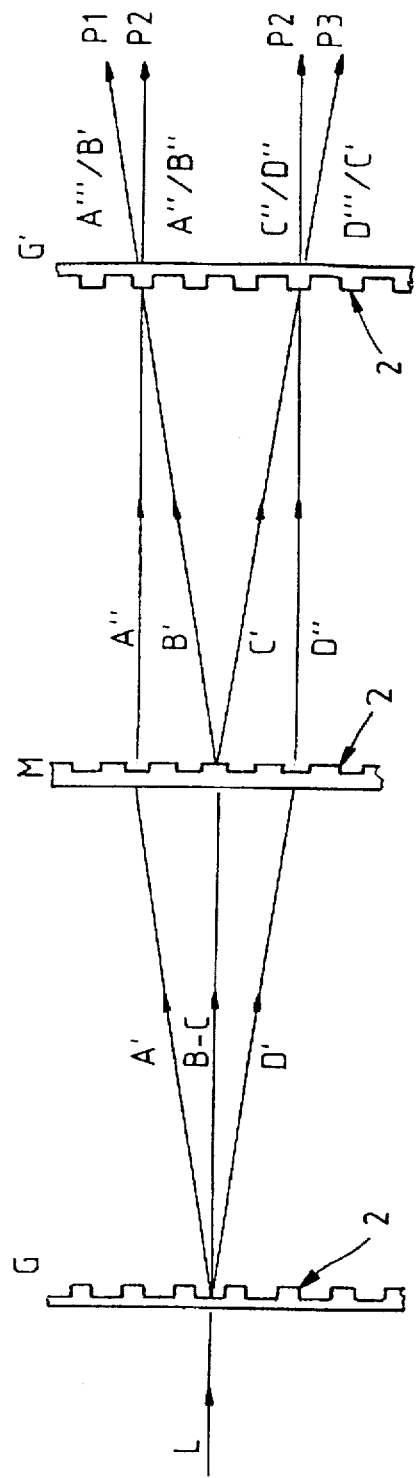
FIG. 2
FIG. 3

PHASE GRATING HAVING AN UNPROTECTED RELIEF STRUCTURE WITH A GRATING STRUCTURE THAT CAUSES DESTRUCTIVE INTERFERENCE OF REFLECTIONS

FIELD OF THE INVENTION

This invention relates to a phase grating for a photoelectric position measuring instrument, and more particularly, a transmitted light phase grating having a relief structure unprotected from ambient media.

Phase gratings are described in Jörg Willhem's dissertation entitled "Dreigitterschrittgeber" [Triple-grating Indexing Transducers], 1978. The vulnerability of such phase gratings to soiling is discussed at page 19 as follows:

"Phase gratings are vulnerable to soiling. If a liquid with the same index of refraction n is used to fill the trenches of a transmitted light phase grating, then the grating no longer has any effect. The incident light phase grating is somewhat less vulnerable, because here the liquid . . . would have to have an index of refraction n=2, in order to render the grating inoperative. For this reason, the protected incident light phase grating is already filled beforehand with an 'immersion liquid'. Soiling of the grating surface then has no further influence on the diffraction efficiencies of the grating. Transmitted light phase gratings, in critical applications, are hermetically sealed off by a glass window." (translated text)

To simplify the production of such protected or covered phase gratings, German patent disclosure DE 34 12 958 A1 describes a protected transmitted light phase grating. A stepped grating formed by a dielectric material is applied by photolithography to a transparent glass substrate. To protect this stepped grating against soiling from outside, a layer of optical cement is applied over the entire surface as a transparent cover layer on the stepped grating. The surfaces of the stepped grating and the exposed surfaces of the transparent substrate are entirely covered by this optical cement layer so that this surface is no longer accessible to soiling from outside.

Nevertheless, covered phase gratings of these kind require considerable effort and expense for its manufacture. In addition, such methods may not even be applicable for fine gratings.

It is therefore desirable to provide a phase grating that is invulnerable to soiling and is simple in design.

BRIEF DESCRIPTION OF THE DRAWINGS

FIG. 2 illustrates schematically the optical function principle of an interferential length measuring instrument employing a phase grating such as that shown in FIG. 1 according to the present invention.

FIG. 3 illustrates in detail a portion of the interferential measuring instrument shown in FIG. 2.

SUMMARY OF THE INVENTION

Figure 1:
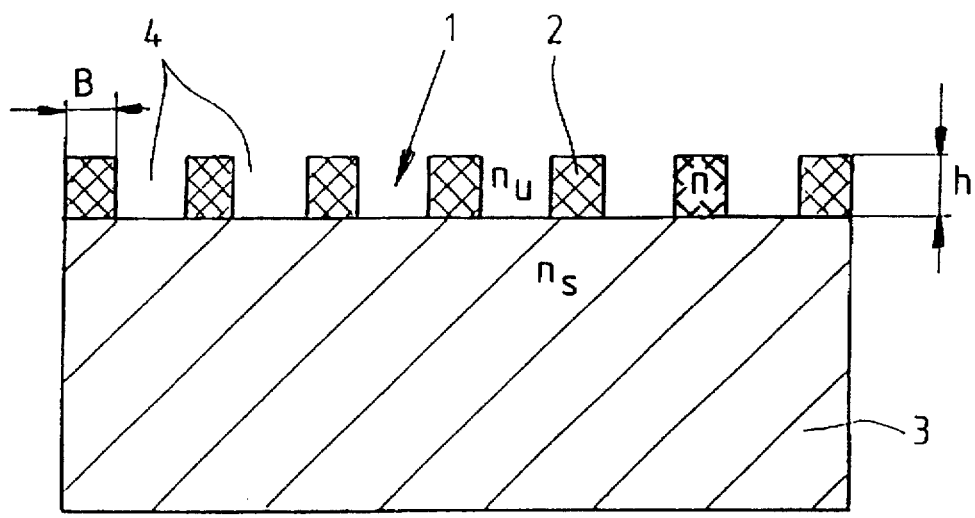
FIG. 1 is a cross-sectional view of a phase grating according to a first preferred embodiment of the present invention.

According to a first aspect of the present invention, a phase grating for a photoelectric position measuring instrument is provided. The phase grating includes a substrate and a relief structure disposed on the substrate. The relief structure is unprotected from ambient media having an index of refraction ($n_u$) to which the phase grating is exposed. The relief structure is formed of a material that has an index of refraction (n) different from the index of refraction ($n_u$) of the ambient medium such that regardless of the type of ambient medium to which the phase grating is exposed, the difference in the index of refraction between the relief structure and the ambient medium is always preserved.

According to a second aspect of the present invention, the relief structure has a land height h wherein the land height h and the index of refraction (n) of its material are adapted to one another in such a way that reflections that occur at the transition from the ambient medium to the relief structure and from the relief structure to the substrate material largely cancel one another out as a result of destructive interference.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS OF THE PRESENT INVENTION

FIG. 1 is a cross-sectional view of a phase grating according to a first preferred embodiment of the present invention. The phase grating 1 includes a substrate 3 and a relief structure 2 applied to a surface of the substrate 3. The relief structure 2 is formed by a high-refraction material. In a preferred embodiment this material is a dielectric material, such as titanium dioxide ($TiO_2$), tantalum pentoxide ($Ta_2O_5$), or aluminum oxide ($Al_2O_3$). In a preferred embodiment the substrate 3 is a conventional material such as glass, quartz or other similar material. The impeding ambient media adjacent to the phase grating 1 is, theoretically, air having an index of refraction of $n_u=1$. In actuality, however, because the phase grating 1 is used in position measuring instruments in an unprotected form, see FIGS. 2 and 3 for example, the grating is exposed to media such as water, solvents, oils, etc. Soiling of the phase grating 1 and in particular of its relief structure 2 from that media will occur. The grating is unprotected because the gaps between the relief structure 2 were not purposefully filled in the manufacturing state, and thus are exposed directly to the ambient media during use. The ambient media to which the grating may be exposed has an index of refraction that may range from about $n_u \approx 1.3$ to about $n_u \approx 1.6$. The index of refraction $n_u$ of this media is near the index of refraction $n_s$ of the substrate 3, which is approximately equal to about 1.5

In the event that the indices of refraction $n_u$ and $n_s$ are similar or even equal, the diffraction effect of the grating 1 is extremely reduced or elevated. However, if high-refraction material, such as $Ta_2O_5$, $TiO_2$ or $Al_2O_3$, which have an index of refraction of about $n \geq 1.8$, is used for forming the relief structure 2, then an adequate difference in the index of refraction between the substrate and the relief structure 2 thereby preserving the diffraction action of the phase grating 1.

The use of high-refraction materials may initially appear disadvantageous since the reflections at the boundary faces of the relief structure 2 become markedly greater. This leads to reflection losses at the grating surface (relief structure 2) and undesired scattered light can thus occur.

These disadvantages are reduced or avoided by a suitable combination of the index of refraction n of the material of the relief structure 2 and its geometrical embodiment. For the diffraction properties of a laminar phase grating of this kind, not only is the land width B of the grating relevant but also the optically effective phase depth θ is relevant. This phase depth θ is dependent in turn on the land height h of the relief structure 2 and on the difference between the index of refraction n of the relief structure 2 and the index of refraction $n_u$ of the ambient medium 4.

The optically effective phase depth θ can be calculated by the equation (1) below:

$$\theta = \frac{2\pi}{\lambda} \, h(n - n_u) - M \cdot 2\pi, \text{ where } M = 0, 1, 2 \ldots, \quad (1)$$

and n is the index of refraction of the material of the relief structure 2, λ is the wavelength of the light, h is the height of land of the relief structure, and $n_u$ is the index of refraction of the ambient medium 4. Thus, an infinitely many combinations of the index of refraction n and land height h can produce a phase grating 1 with identical diffraction properties. The dimensioning of the phase grating 1 is calculated with $n_u=1$ so that the phase grating has optimal properties with a size for $n_u=1$.

In the observations of reflection, it must be taken into account that two reflections occur, namely at the transition from the ambient medium 4 to relief structure 2, and at the transition from the relief structure 2 to the substrate material 3. If the land height h is suitably chosen, then it is possible to achieve a situation in which the beams of the two reflections interfere destructively with one another or in other words cancel one another out. This is true for a vertically incident beam of light, if equation (2) is satisfied:

$$h \cdot n = \frac{\lambda}{2} \, N, \text{ where } N = 1, 2, 3, \ldots \quad (2)$$

For an obliquely incident beam of light, that is true if equation (3) is satisfied:

$$h \cdot n \cdot \cos\left(\arcsin\frac{\sin(\alpha)}{n}\right) = h \cdot n \cdot \sqrt{1 - \left(\frac{\sin(\alpha)}{n}\right)^2} = \frac{\lambda}{2} \, N, \quad (3)$$

where $N=1, 2, 3, \ldots$
and α is the angle of incidence of the light in air. In the manufacture of such phase gratings, it is accordingly necessary always to observe the conditions of equations 2 and 3.

In concrete terms, this means that equation 2 or 3 is solved for h and that value of h is inserted into equation 1 to produce:

$$\theta = \pi \cdot \left( N \cdot \frac{n-1}{n} - 2M \right)$$

or $$n = \frac{N}{N - 2M - \frac{\theta}{\pi}}$$

where θ depends on the desired diffraction properties of the grating; for instance, θ=π. It follows from this that n=2 where N=2 and M=0.

In other words, the relief structure 2 of the grating 1 is made up of lands with a height h and an index of refraction n near 2. The land height h required is then found by solving equation (1). These observations apply when the phase grating 1 is illuminated from the relief structure 2 and also when it is illuminated from the side of the substrate 3.

To illustrate a typical use of a phase grating according to the present invention, a position measuring device is described with reference to FIGS. 2 and 3. FIG. 2 illustrates schematically the optical function principle of an interferential length measuring instrument employing a phase grating according to the present invention. FIG. 3, details a portion of the interferential measuring instrument shown in FIG. 2.

The lighting device includes a light source Q, a condenser K and photoelements P1, P2 and P3 which are illustrated schematically. The radiation originating at the light source, preferably an infrared radiator Q is collimated by the condenser lens K and illuminates the scanning phase grating G. Both the flat wave generated by the light source Q and the condenser K and the diffracted waves are represented by the normals to the wavefront. The assumption is a flat wave with a wavelength vertically strikes the scanning grating G.

The principle of operation is based on the fact that the partial beam diffracted at a moving grating scale M is phase modulated by the grating motion. This means that when the grating M is displaced by one grating period, the phase of the two diffracted 1st order partial beams each passes through 360°. The +1st order and −1st order phases move in opposite directions from one another. If the ±1st order beams are again made to interfere, the result is a beam of light modulated with twice the displacement frequency.

This is true both for amplitude scales and phase grating scales. Phase gratings, however, can be dimensioned such that the zero order beam is extinguished, and thus, in the two 1st orders of diffraction, a greater proportion of the energy shone in is available.

FIGS. 2 and 3 are illustrated to show the principle of operation of the position measuring instrument. The scale grating M may be a transmission grating or the scale M may be reflective in which case grating G and grating G' and condensers K are in fact the same grating.

As shown in FIG. 3, the beam of light L striking this grating G is partly diffracted or admitted. The resultant partial beams A', B–C and D' are diffracted at the reflective scale M and on reentering the scanning phase grating G and G' interfere with one another. The condenser lens K focuses the intrinsically parallel partial beams A'''/B', A''/B'' or C''/D''' and D'''/C', respectively, at the associated photodetectors P1, P2 and P3.

On motion of the scale M, the three photodetectors P1, P2, P3 each furnish signals displaced by one-third period where the signal period equals half the scale grating.

This phase displacement is determined by the dimensions of the scanning grating G or G', i.e., furrow width and depth, as already known from European patent disclosure EP 0 163 362 B1.

The cooperation of the components shown will now be explained. The incident wave, on passage through the index grating i.e., scanning grating G, is diffracted substantially in the three directions, −1, 0, +1. The index grating G is embodied such that the zero order beams are delayed in phase by the amount ¢ compared with the ±1st order beams. Upon arrival of the beams at the scale M they are each diffracted in two ±1st order directions. The scale M is embodied such that there is no zero order of diffraction.

Upon displacement of the scale M relative to the index or scanning grating G and G' which may be physically identical, the beams of the +1st order (n=+1) diffracted at the scale M undergo a phase change which is proportional to the displacement X in an amount Ω and those of the −1st order (n=−1) in an amount −Ω, where $$\Omega = \frac{2\pi x}{C}$$

Upon passage through the index or scanning grating G or G', diffraction and phase displacement again ensue. Waves of the same direction and of the same optical path length enter into interference. The phases of the interfering partial waves results from the sum of the phase changes that the various partial beams undergo upon passage through the gratings. When illumination is from a nonmonochromatic and spatially incoherent light source, only the interfering waves in the +1, 0 and −1 directions contribute to recovery of a signal. At the output of the grating system, a wave of phase −Ω interferes, in the direction marked +1, with a wave of the phase 2θ+Ω.

The grating divisions of gratings G, G' and M, are preferably embodied as phase gratings.

In contrast to length or angle measuring instruments that are equipped with conventional phase gratings profiled on the surface of a substrate, in the phase gratings, G, G' according to the invention the ambient media does not make itself felt as an impediment.

The term "transmitted light phase grating" or "transmission phase grating" according to the present invention means that the relief structure 2, including the lands with the index of refraction n and the intervening gaps are transparent, and the measurement beams (partial beams) pass through.

It is to be understood that the forms of the invention described herewith are to be taken as preferred examples and that various changes in the shape, size and arrangement of parts may be resorted to, without departing from the spirit of the invention or scope of the claims.

What is claimed is:

1. A phase grating for a photoelectric position measuring instrument, comprising:

a substrate;

a relief structure disposed on said substrate wherein said relief structure is unprotected from ambient media, wherein the relief structure has an index of refraction (n) which differs from the index of refraction ($n_u$) of the ambient media in such a manner that regardless of the type of ambient medium, a difference in index of refraction between the relief structure and the ambient medium is always preserved and that the land height (h) of the relief structure and the index of reflection (n) of its material are adapted to one another in such a way that reflections, which occur at the transition between the ambient medium and the relief structure and between the relief structure and the substrate material, are at least largely extinguished by destructive interference.

2. The phase grating according the claim 1 wherein the index of refraction (n) of the relief structure is higher than the index of refraction ($n_u$) of the ambient medium.

3. The phase grating of claim 1, wherein the material of the relief structure and of the substrate is transparent, and that for the land height (h), for vertical incidence of light on the phase grating the following equation applies:

$$h \cdot n = \frac{\lambda}{2} \, N \, (N = 1, 2, 3, \ldots)$$

and for oblique incidence of light the following equation applies:

$$h \cdot n \cdot \cos\left(\arcsin\frac{\sin(\alpha)}{n}\right) =$$

$$h \cdot n \cdot \sqrt{1 - \left(\frac{\sin(\alpha)}{n}\right)^2} = \frac{\lambda}{2} \, N \, (N = 1, 2, 3 \ldots)$$

in which α is the angle of incidence of the light in air.

4. The phase grating according to claim 1 wherein the material of the relief structure is selected from the group consisting of titanium dioxide ($TiO_2$), tantalum pentoxide ($Ta_2O_5$), and aluminum oxide ($Al_2O_3$).

5. A photoelectric position measuring instrument comprising:

a light source for emitting light;

a phase grating comprising a transparent substrate material on which a transparent relief structure having an index of refraction of n ≥ 1.8 wherein the phase grating is exposed to an ambient medium whose index of refraction ($n_u$) differs from the index of reflection (n) of the relief structure;

photodetectors for detecting partial beams, which are defracted at the phase grating as the light passes through the phase grating;

wherein the land height (h) and the index of refraction (n) of the relief structure are adapted to one another such that reflections that occur at the transition between the ambient medium and the relief structure and between the relief structure and the substrate material at least largely cancel one another out from destructive interference.

* * * * *

UNITED STATES PATENT AND TRADEMARK OFFICE
CERTIFICATE OF CORRECTION

PATENT NO. : 5,696,584
DATED : December 9, 1997
INVENTOR(S) : Andreas Franz et al.

It is certified that error appears in the above-indentified patent and that said Letters Patent is hereby corrected as shown below:

In claim 2, line 1, replace "the" (second occurrence) with --to--.

Signed and Sealed this

Eighteenth Day of April, 2000

Attest:

Q. TODD DICKINSON

Attesting Officer     Director of Patents and Trademarks